United States Patent [19]

Smejkal

[11] 4,000,219
[45] Dec. 28, 1976

[54] EPDM COMPOSITIONS WITH IMPROVED PAINTABILITY

[75] Inventor: Joseph P. Smejkal, Parkersburg, W. Va.

[73] Assignee: Borg-Warner Corporation, Chicago, Ill.

[22] Filed: Apr. 24, 1975

[21] Appl. No.: 571,328

[52] U.S. Cl. .................. 260/876 R; 260/23.5 A
[51] Int. Cl.² ........................................ C08L 23/16
[58] Field of Search ........................... 260/876 R

[56] References Cited
UNITED STATES PATENTS

| | | | |
|---|---|---|---|
| 3,646,169 | 2/1972 | Wirth | 260/889 |
| 3,657,163 | 4/1972 | Kishikawa et al. | 260/876 R X |
| 3,706,819 | 12/1972 | Usamoto et al. | 260/889 |

*Primary Examiner*—Carman J. Seccuro
*Attorney, Agent, or Firm*—Richard J. Schlott

[57] ABSTRACT

Blends of ethylene-propylene-diene monomer terpolymers (EPDM) containing from about 4% to about 40% by weight based on the total composition of a graft copolymer selected from the group acrylonitrile-butadiene styrene (ABS), methyl methacrylate-acrylonitrile-butadiene-styrene (MABS) and methyl methacrylate-butadiene-styrene (MBS) graft polymers exhibit improved paint adhesion characteristics when molded and cured.

6 Claims, No Drawings

EPDM COMPOSITIONS WITH IMPROVED PAINTABILITY

BACKGROUND

The present invention relates to novel polyolefin compositions having improved paintability. More particularly, the invention relates to blends comprising a major proportion of ethylene-propylene terpolymer and a minor proportion of a graft polymer which exhibit improved paintability. The graft polymer is selected from polymers of a vinyl aromatic hydrocarbon and at least one additional monomer selected from acrylonitrile, methacrylonitrile, and methylmethacrylate polymerized in the presence of a rubbery diene substrate. Still more particularly, the invention relates to blend compositions comprising 60% or more by weight ethylene-propylene diene monomer terpolymer (EPDM) and correspondingly 40% or less by weight graft polymer selected from the group acrylonitrile-butadiene-styrene (ABS), methylmethacrylate-butadiene-styrene (MBS) and methylmethacrylate-acrylonitrile-butadiene-styrene (MABS), which exhibit improved paintability, characterized in that adhesion of paint to these novel blend compositions is markedly improved over the EPDM terpolymer.

The use of EPDM olefin polymers in, for example, automotive applications, particularly where resiliency and/or impact resistance is required, has been limited by the poor paintability characteristics of these materials. Considerable research has been directed to overcoming this deficiency, and methods such as incorporation of low molecular weight polar compounds, surface activation by oxidizing or etching solutions and even treatment of the surfaces with flame, arcs or plasma spray techniques have been developed. While some improvement has resulted, particularly where surface treatments are employed, the more successful require multiple step treatments of the molded part to prepare the article for painting. Thus a composition capable of being molded to give parts having good paint adhesion characteristics without requiring added processing treatments would be a useful advance in the art.

SUMMARY OF THE INVENTION

It has now been found that ethylene-propylene polymers, in particular EPDM compositions, when modified by blending with graft polymers selected from ABS, MABS and MBS graft polymers, exhibit excellent paint adhesion characteristics. In particular, the blends containing from about 60% to about 96% by weight of an EPDM, and correspondingly from about 40% to about 4% by weight graft polymer when compounded with conventional curing additives, molded and cured, exhibit markedly improved paint adhesion characteristics.

DETAILED DESCRIPTION

The ethylene-propylene polymers useful for the purposes of this invention are the widely available EPDM materials of commerce. EPDM polymers are generally polymers containing from 20 to 80% by weight of the ethylene monomer component and correspondingly from 80 to 20% by weight of the propylene monomer component. An additional non-conjugated diene monomer is employed, the amount used normally being sufficient to provide curing sites, but not so great as to interfere seriously with the rubbery character of the product, i.e., in the range of 1 to about 20% by weight and preferably not greater than 10% by weight of the EPDM product. Typically the monomer is a straight chain or cyclic diolefin such as 1,4-hexadiene, dicyclopentadiene, ethylidene norbornene and the like. These terpolymers of ethylene and propylene are widely known, and are disclosed and described for example in U.S. Pat. Nos. 2,933,480 and 3,060,973.

The graft polymer component utilized in the present invention may be made with a substrate of a polybutadiene rubber or a butadiene-styrene copolymer rubber containing up to 35% comonomer. The graft polymer is prepared by polymerizing the grafting monomers such as styrene, methylmethacrylate, acrylonitrile and the like in the presence of the rubbery substrate. Conventional polymerization processes as for example the ABS emulsion polymerization process disclosed in U.S. Pat. No. 3,238,275, as well as suspension and solution processes may be employed for preparing the ABS, MBS and MABS resins useful in the practice of this invention. Typical MBS preparations are disclosed in U.S. Pat. No. 3,671,610, and MABS polymer preparations are disclosed in U.S. Pat. No. 3,657,391.

The proportions of the rubber component and the particular grafting monomer components employed in preparing the ABS, MABS, and MBS resins useful for the purposes of this invention are not critical, and may thus be varied over a wide range of values. Generally, the rubber component will be a polybutadiene or a rubbery copolymer containing up to 35% by weight of a vinyl monomer such as styrene or an acrylic monomer such as methylmethacrylate, ethyl acrylate or acrylonitrile. The graft polymer will contain between about 10% and about 80% of the rubbery component, the remainder being the graft or rigid phase. The preferred resins are those containing from 25 to 70% by weight of rubber phase in the form of a polybutadiene or copolymer of butadiene containing up to 35% styrene comonomer, and correspondingly from 75% to about 30% by weight rigid phase prepared from methylmethacrylate, styrene or acrylonitrile or mixtures thereof. Minor amounts of crosslinking monomers such as divinyl benzene, ethylene glycol dimethacrylate and the like may also be included in the preparation of these resins.

The blending of the EPDM component and the graft polymer component is accomplished by Banbury mixing the components together, optionally with added fillers and stabilizers, then milling on a cold roll mill to incorporate conventional curing system components. The rubber blend may then be sheeted off, and molded and cured to produce the parts.

The molded parts are then directly painted by conventional methods, including spray, brush and roller application techniques. Where like parts prepared from ethylene-propylene rubbers exhibit virtually no paint adhesion without prior treatment and modification of the surfaces, parts prepared from EPDM rubber-graft polymer blends of this invention are found to exhibit markedly improved paint adhesion.

The preparation of the blends of this invention and the markedly improved paintability of these will be better understood by consideration of the following examples, which are provided by way of illustration of the instant invention and are not intended to limit the scope thereof.

DETAILED EMBODIMENTS

THE ETHYLENE-PROPYLENE POLYMER

The ethylene-propylene-diene monomer terpolymer rubber employed for these examples was Nordel 1560 from E. I. DuPont Company. This EPDM has a Mooney viscosity of 60 (ML at 250° F.), an iodine number of 10, and is a terpolymer containing about 25±10 mole % propylene, 75±10 mole % ethylene and 2-5 mole % unconjugated diene, as determined by physical analysis.

THE GRAFT POLYMERS

The ABS graft polymer component employed in Examples 1 through 10 inclusive was prepared by polymerizing about 45 parts by weight styrene and about 25 parts by weight acrylonitrile in the presence of 30 parts by weight polybutadiene latex, substantially as taught by Example 1 of U.S. Pat. No. 3,238,275.

The MBS copolymer of Example 11 was prepared by polymerizing a mixture of 17.5 parts by weight methylmethacrylate and 17.5 parts by weight styrene in the presence of a butadiene-styrene (3:1) copolymer rubber in a manner taught by Example 1 of U.S. Pat. No. 3,671,610.

PREPARATION OF THE BLENDS

The blends were prepared by charging the EPDM, the particular graft resin employed, the zinc oxide and the stearic acid to a Banbury mixer and working to a maximum temperature of 350° F. The mixture was then dropped onto a two-roll mill and milled for 2 minutes at 300-315° F. The mixture was cooled, then blended with the curing components on a cold mill. The composition was sheeted out and molded in a four cavity ASTM rubber mold preheated to 320° F., and cured for 20 minutes at full pressure. The resulting test plaques were submitted for paint adhesion testing.

TABLE I

| | Blend Formulations Example No. | | | | | | | | | | |
|---|---|---|---|---|---|---|---|---|---|---|---|
| Components | 1 | 2 | 3 | 4 | 5 | 6 | 7 | 8 | 9 | 10 | 11 |
| EPDM[1] | 100 | 99 | 98 | 98 | 96 | 95 | 90 | 80 | 60 | 40 | 60 |
| ABS[2] | — | 1 | 2 | 3 | 4 | 5 | 20 | 20 | 40 | 60 | — |
| MBS[3] | — | — | — | — | — | — | — | — | — | — | 40 |
| Zinc Oxide | 5 | 5 | 5 | 5 | 5 | 5 | 5 | 5 | 5 | 5 | 5 |
| Stearic Acid | 1 | 1 | 1 | 1 | 1 | 1 | 1 | 1 | 1 | 1 | 1 |

[1]Nordel 1560, E. I. DuPont Company.
[2]ABS from 45 pbw styrene and 25 pbw acrylonitrile with 30 pbw polybutadiene substrate.
[3]MBS from 17.5 pbw styrene and 17.5 pbw methylmethacrylate with 65 pbw butadiene-styrene (3:1) rubber.

| | |
|---|---|
| Sulfur | 1.5 pbw |
| Zinc Diethyldithiocarbamate | 1.25 pbw |
| Tetramethyl thiuram disulfide | 1.25 pbw |
| Mercaptobenzothiazole | 0.5 pbw |

The samples for paint adhesion testing were prepared by first cleaning the specimen surfaces with hexane, allowing them to dry, then spray-painting with a flat-black soya-alkyd enamel. The painted parts were oven-dried for 48 hours at 150° F., then allowed to stand 24 hours at room temperature prior to testing.

The paint adhesion test employed was a conventional crosscut adhesion test, run by first making crosshatched cuts 1/32 inches apart, to form 100 squares 1/32 inches × 1/32 inches. Scotch brand cellophane tape was applied firmly to the cut and then removed by pulling rapidly at an angle perpendicular to the surface. The measure of paint adhesion is determined by the percentage of paint squares remaining on the surface intact. The test data for the blends of Examples 1-11 are given in TABLE II.

TABLE II

| | Paint Adhesion Test Data | | | | | | | | | | |
|---|---|---|---|---|---|---|---|---|---|---|---|
| Example No. | 1 | 2 | 3 | 4 | 5 | 6 | 7 | 8 | 9 | 10 | 11 |
| ABS (%): | 0 | 1 | 2 | 3 | 4 | 5 | 10 | 20 | 40 | 60 | — |
| MBS (%): | — | — | — | — | — | — | — | — | — | — | 40 |
| Adhesion[1] (%) | 3-5 | 5-10 | 5-10 | 5-10 | 15-20 | 65-75 | 80-85 | 21 | 85 | 89 | 92 |

[1]Average % squares remaining after tape test.

It will be seen that in Example 1, EPDM containing no added graft polymer, only minimal adhesion occurs, while increasing amounts of graft polymer effect a marked improvement in paint adhesion, beginning with Example 5, which contains only 4% of the graft polymer. Example 8, containing 20% graft polymer, gave an anomalously lower result than did Examples 7 (10%) or 9 (40%). This value, while considerably better than obtained for EPDM alone, is considered to be aberrant but is reported in the interests of accuracy.

The instant invention will thus be seen to be a blend consisting of an ethylene-propylene polymer and a graft polymer. The blend composition has marked improvement in paint adhesion characteristics over conventional EPDM formulations. The amount of graft polymer necessary to be included for paint adhesion improvement will vary somewhat with the particular graft polymer employed. In general, the desired graft polymer level will lie between 4% and 40% of the total blend composition.

The Examples are provided by way of illustration to better demonstrate the beneficial properties that result from the use of graft polymers in blends with ethylene-propylene polymers, and the invention is not intended to be limited to the specific polymers and formulations disclosed herein. It will further be apparent to one skilled in the art that various modifications of these blends may be undertaken, including the incorporation of one or more fillers, reinforcing aids and processing aids without departing from the spirit of the invention, and the scope is limited solely by the appended claims.

We claim:

1. A composition comprising a blend of (a) 60–96% by weight of an ethylene-propylene diene monomer terpolymer and (b) 40–4% by weight of a graft polymer resin prepared by polymerizing a monomer mixture selected from the group styrene-acrylonitrile, styrene-methylmethacrylate, and styrene-acrylonitrile-methylmethacrylate in the presence of a polymerized diene homopolymer or copolymer rubber.

2. The composition of claim 1 wherein the rubber comprises from about 10% to about 80% of the graft polymer resin.

3. The composition of claim 1 wherein the rubber is selected from the group polybutadiene and styrene-butadiene copolymer and comprises from about 10% to about 80% of the graft polymer resin.

4. A composition comprising a blend of (a) 60 to 96% by weight of an ethylene-propylene-diene monomer terpolymer having from 20 to 80% by weight ethylene units, from 80 to 20% by weight propylene units and from 1 to 20% by weight nonconjugated diene monomer units and (b) 40 to 4% by weight of a graft polymer prepared by polymerizing from 20% to 90% by weight based on graft polymer of a monomer mixture selected from the group styrene-acrylonitrile, styrene-methylmethacrylate and styrene-acrylonitrile-methylmethacrylate in the presence of from 80% to about 10% of a rubber selected from homopolymers and copolymers of butadiene.

5. A method for improving the paint adhesion properties of ethylene-propylene-diene monomer terpolymers consisting of blending therewith from about 4% to about 40% by weight based on the total blend composition of a graft polymer resin prepared by polymerizing from about 20% to about 90% by weight based on graft polymer of a monomer mixture selected from the group styrene-acrylonitrile, styrene-methylmethacrylate and styrene-acrylonitrile-methylmethacrylate in the presence of from about 80% to about 10% by weight based on graft copolymer of a rubber selected from homopolymers and copolymers of butadiene.

6. An article having improved paint adhesion characteristics prepared by forming and curing a blend comprising (a) 60 to 96% by weight of an ethylene-propylene diene monomer terpolymer, (b) 40 to 4% by weight of a graft polymer prepared by polymerizing from about 20% to about 90% by weight based on graft polymer of a monomer mixture selected from the group styrene-acrylonitrile, styrene-methylmethacrylate and styrene-acrylonitrile-methylmethacrylate and styrene-acrylonitrile-methylmethacrylate in the presence of from 80% to about 20% by weight based on graft copolymer of a rubber selected from homopolymers and copolymers of butadiene.

* * * * *